US012785300B2

(12) United States Patent
Riechmann

(10) Patent No.: US 12,785,300 B2
(45) Date of Patent: Nov. 3, 2026

(54) SPACE-SAVING ACTUATOR FOR A CONNECTION DEVICE AND METHOD FOR ELECTRICALLY CONNECTING AND SUBSEQUENTLY DISCONNECTING AN ELECTRICAL CONDUCTOR TO/FROM A BUSBAR WITH A CONNECTION DEVICE

(71) Applicant: HARTING Electric Stiftung & Co. KG, Espelkamp (DE)

(72) Inventor: Till Riechmann, Stemwede (DE)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 322 days.

(21) Appl. No.: 18/726,977

(22) PCT Filed: Jan. 23, 2023

(86) PCT No.: PCT/DE2023/100048
§ 371 (c)(1),
(2) Date: Jul. 5, 2024

(87) PCT Pub. No.: WO2023/147811
PCT Pub. Date: Aug. 10, 2023

(65) Prior Publication Data

US 2025/0096487 A1 Mar. 20, 2025

(30) Foreign Application Priority Data

Feb. 7, 2022 (DE) ..................... 10 2022 102 812.7

(51) Int. Cl.

*H01R 4/48* (2006.01)
*H01R 9/24* (2006.01)
*H01R 43/16* (2006.01)

(52) U.S. Cl.

CPC ......... *H01R 4/4833* (2023.08); *H01R 4/4835* (2023.08); *H01R 9/2491* (2013.01); *H01R 43/16* (2013.01)

(58) Field of Classification Search

CPC .... H01R 4/4833; H01R 4/4835; H01R 43/16; H01R 9/2491
See application file for complete search history.

(56) References Cited

U.S. PATENT DOCUMENTS 6,146,187 A * 11/2000 Pallai .................. H01R 4/4828 439/441
2004/0043670 A1 * 3/2004 Feldmeier ............ H01R 13/506 439/709

(Continued)

FOREIGN PATENT DOCUMENTS

DE 9419020.8 3/1995
DE 10037550 2/2002

(Continued)

OTHER PUBLICATIONS

Search Report issued in German Patent Appln. Serial No. 10 2022 102 812.7 dated Nov. 17, 2022, with machine English translation, 18 pages.

(Continued)

*Primary Examiner* — Truc T Nguyen
(74) *Attorney, Agent, or Firm* — HAYES SOLOWAY P.C.

(57) ABSTRACT

In order to minimize the horizontal space requirement for releasing a vertically actuable actuator of a connection device the actuator is formed to be substantially cylindrical. Therefore, by virtue of rotation about the cylinder axis of the actuator, an electrical conductor can be released in a field-terminable manner using a screwdriver by a space-saving rotational movement of the actuator, as a result of which a (Continued)

Figures 1A, 1B, 1C:
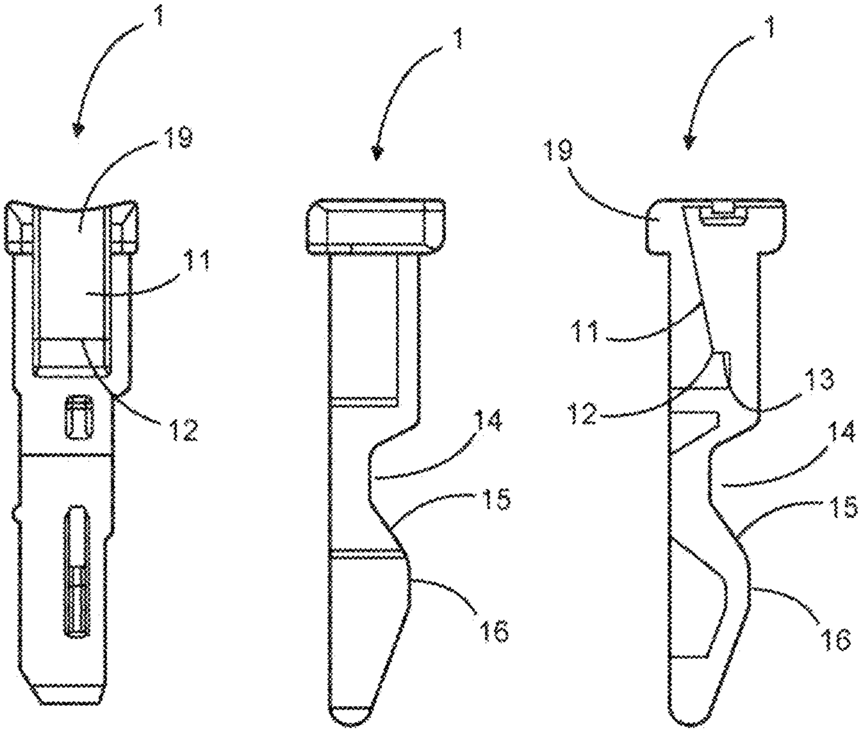
Fig. 1a Fig. 1b Fig. 1c PRIOR ART

space-consuming lever movement of the screwdriver which is otherwise usual in the prior art is dispensed with.

20 Claims, 8 Drawing Sheets

(56) References Cited

U.S. PATENT DOCUMENTS

| | | | | |
|---|---|---|---|---|
| 2007/0141910 | A1* | 6/2007 | Camino | H01R 4/5008 439/607.41 |
| 2007/0207662 | A1 | 9/2007 | Germani | |
| 2009/0156041 | A1* | 6/2009 | Radle | H01R 4/4816 439/291 |
| 2010/0311263 | A1* | 12/2010 | Hoppmann | H01R 4/4821 439/304 |
| 2014/0227914 | A1* | 8/2014 | Tedeschi | H01R 13/629 439/816 |
| 2015/0255896 | A1* | 9/2015 | Niemann | H01R 9/2625 439/121 |
| 2016/0020543 | A1* | 1/2016 | Tedeschi | H01R 4/4833 439/733.1 |
| 2019/0221951 | A1 | 7/2019 | Loetkemann et al. | |
| 2022/0094081 | A1* | 3/2022 | Schlegel | H01R 13/6583 |
| 2022/0247122 | A1* | 8/2022 | Tuerkekoele | H01R 4/4833 |
| 2024/0258744 | A1* | 8/2024 | Ge | H01R 13/62955 |

FOREIGN PATENT DOCUMENTS

| | | |
|---|---|---|
| DE | 102007009082 | 9/2007 |
| DE | 102014115009 | 2/2016 |
| DE | 202014010620 | 3/2016 |
| DE | 202014010621 | 3/2016 |
| DE | 102016113974 | 2/2018 |
| EP | 1544947 | 6/2005 |

OTHER PUBLICATIONS

International Search Report and Written Opinion issued in PCT/DE2023/100048, dated May 19, 2023, with English translation, 24 pages.

* cited by examiner

SPACE-SAVING ACTUATOR FOR A CONNECTION DEVICE AND METHOD FOR ELECTRICALLY CONNECTING AND SUBSEQUENTLY DISCONNECTING AN ELECTRICAL CONDUCTOR TO/FROM A BUSBAR WITH A CONNECTION DEVICE

DESCRIPTION

The invention is based on an actuator of the type as per independent claim 1.

Furthermore, the invention is based on a connection device comprising the actuator according to claim 1, as well as a cage tension spring, a busbar and an insulating body.

In addition, the invention is based on a plug connector which has at least one such connection device according to claim 4 and also has a plug contact electrically conductively connected to the respective busbar for each connection device.

Furthermore, the invention is based on a method for the electrical connection and subsequent disconnection of an electrical conductor, in particular a core of an electrical cable, to or from a busbar, in particular by means of a connection device according to claim 4.

Such actuators and connection devices can be used, for example, to detachably connect electrical conductors, in particular stranded wires of electrical cables, to plug contacts of a plug connector on the connection side in an electrically conductive manner and to mechanically fasten them to the plug connector.

PRIOR ART

A large number of connection devices for electrical conductors, in particular stranded conductors, are known in the prior art.

Publication DE 10 2007 009 082 A1 describes a multipole electrical connector with spring contacts. For each conductor to be connected to the connector, the connector has a first substantially cylindrical opening designed to receive the conductor and a second opening parallel to the first opening and designed to receive an actuating pin which—sliding in the second opening—acts on a spring contact of the connector according to its position in order to lock the conductor to the connector or release it from the connector. When the conductor is locked in the connector by means of the spring contact, the actuating pin is fully inserted into the connector. To release the conductor from the spring contact, it is disclosed to insert a tool—for example a screwdriver or other functionally equivalent tool—through the window provided in the upper portion of the side wall of the connector laterally into the seat of the actuating pin and to lift the actuating pin by levering with the tool at the lower edge of the window. The disadvantage of this is that said side wall must be accessible for this, the actuation process takes up a lot of space, and the release of the conductor is prevented if the connector is installed-for example in an add-on housing.

The publication DE 20 2014 010 620 U1 proposes an arrangement comprising a cage tension spring, which enables simple connection and disconnection of a conductor to a spring contact element. Connecting and disconnecting conductors to and from the connector is possible without aids or tools and without a great deal of force due to lateral operation. The disadvantage of this is that the insulating body must be accessible on the plug side for unlocking.

The publication DE 20 2014 010 621 U1 proposes to arrange a spring-loaded push-push mechanism on the actuating means, similar to a ballpoint pen mechanism, by means of which the actuating means can be moved linearly between the first end position and the second end position. The disadvantage of this is that such a push-push mechanism is naturally complex and error-prone and requires more space.

The publication DE 10 2014 115 009 B3 shows a plug connector consisting of an insulating body, at least one electrical contact accommodated in the insulating body, and, for the electrical contact, an actuating mechanism which consists of a first actuating pin and a second actuating pin. The electrical contact has a spring contact element for contacting an electrical conductor or cable, said spring contact element being opened and closed by the first actuating pin. The second actuating pin is provided for opening the spring contact element. This means that no tools or other aids are required to close or open the spring contact element and it can be unlocked from the direction of the cable connection. However, the corresponding mechanism considerably widens the design, which is extremely undesirable, as the aim is usually to achieve the highest possible contact density for connectors. Furthermore, this mechanism is complex and prone to errors.

Disadvantages can therefore arise in this prior art, roughly summarized, due to the size of the corresponding design, because this has a negative effect on the possible contact density and also if such insulating bodies are to be installed in grommets or add-on housings with predetermined dimensions. For this purpose, the dimensions of the insulating bodies must ultimately fit into the specified housing dimensions. There is also a need to be able to unlock the conductors, particularly from the cable connection side, even after installing such an insulating body in an add-on housing, without having to remove the entire insulating body from the add-on housing again.

Based on this prior art, publication DE 10 2016 113 974 B1 has therefore set itself the task of taking these aforementioned disadvantages and market requirements into account and specifying a design which, on the one hand, allows the insulating body to be as small as possible and, at the same time, enables the electrical conductors to be unlocked manually even if the insulating body is already installed in an add-on housing.

To this end, the aforementioned publication discloses that the actuator has the following features:

- an engagement slope and an adjacent engagement edge as well as an engagement step starting at the engagement edge and directed away from the engagement slope at an obtuse angle for transferring the actuator from the actuated state to the non-actuated state, and

- a tool insertion opening arranged in the actuator with the actuating recess in a common surface for inserting the flat-blade screwdriver on the cable connection side, wherein the tool insertion opening is adjoined by said engagement slope.

A disadvantage of this design is that the actuator can be unlocked from the cable connection side when installed in an add-on housing, wherein the tool, e.g. the screwdriver, still has to be moved at a sufficiently large angle in a lever movement about the aforementioned angle of attack in order to lever the actuator out of the insulating body. This is sufficient for most applications, such as use in an add-on housing, for example on a wall opening or similar, as the lever movement of the screwdriver can take place over the edge of the add-on housing.

In practice, however, special applications have also arisen in which it is necessary in confined spaces, for example in an engine compartment, to always hold the screwdriver in the cable insertion direction during actuation when connecting and disconnecting the electrical conductor, i.e. not to have to swivel the screwdriver sideways, or at least only as little as possible, even to disconnect the electrical conductor, for example to lever the actuator out of the insulating body.

The German Patent and Trade Mark Office has searched the following prior art in the priority application for the present application:

DE 10 2014 115 009 B3, DE 10 2016 113 974 B4, DE 100 37 550 A1, DE 10 2007 009 082 A1, DE 94 19 020 U1, DE 20 2014 010 620 U1, DE 20 2014 010 621 U1 and EP 1 544 947 A2.

STATEMENT OF PROBLEM

The problem addressed by the invention is therefore to reduce the space required when disconnecting an electrical conductor from a connection device and at the same time to ensure a compact design of the connection device.

The problem is solved by the subject matter of the independent claims.

An actuator is used to actuate a cage tension spring of a connection device.

The actuator can be brought into a first open position in which it tensions the cage tension spring and thus enables an electrical conductor to be guided through a window recess of a tensioning leg of the cage tension spring in a cable insertion direction.

Furthermore, the actuator can be brought into a closed position, in which it relaxes the cage tension spring in comparison to the aforementioned open position and thus enables the electrical conductor arranged in the window recess to be electrically contacted by means of the cage tension spring with a busbar also guided through the window recess and mechanically fixed to the busbar, in particular by pulling the electrical conductor against the busbar by means of the window recess of the tensioning leg.

The actuator can be moved from the first open position to the closed position by a translational movement.

Furthermore, the actuator can be transferred by means of a rotational movement from the closed position to a second open position, in which it tensions the cage tension spring again in relation to the closed position and thus enables the electrical conductor to be removed from the window recess of the tensioning leg of the cage tension spring against the cable insertion direction.

Said translational movement of the actuator can preferably take place in the cable insertion direction. The rotational movement can take place around an axis that runs parallel to the cable insertion direction.

In particular, the electrical contacting and mechanical fixing of the electrical conductor to the busbar is made possible by the cage tension spring still having a certain pre-tension in said closed position, which is, however, lower than the tension that it experiences in the first open position of the actuator. This pre-tension serves to create a sufficient pressure force with which the electrical conductor is pulled against the busbar in the closed position of the actuator by the spring force of the cage tension spring by means of its window recess.

The electrical conductor can thus be electrically conductively contacted with the busbar and mechanically fixed to it in a first method step by said translational movement of the actuator, and can be detached from the busbar again in a second method step by the rotational movement of the actuator.

The actuator can be actuated with a screwdriver in both the first and second method steps, wherein the screwdriver can advantageously always be aligned in the direction of the translational movement of the actuator in both method steps.

In the first method step, the electrical conductor can be pulled against a busbar by a cage tension spring for electrical contacting, in that a portion of a tensioning leg of the cage tension spring, which thereby at least partially relaxes, enters an actuating recess of the actuator, made possible by said translational movement of the actuator. In the second method step, the electrical conductor can be separated from the busbar again by the aforementioned portion of the tensioning leg being displaced out of the actuating recess again by a rotational movement of the actuator in a first direction of rotation, thus tensioning the cage tension spring again.

To reconnect an electrical conductor, the actuator can also be rotated back to its original orientation in a second rotational movement in a third method step, namely in a second direction of rotation that is opposite to the first direction of rotation.

Advantageous embodiments of the invention are given in the dependent claims and the following description.

An advantage of the invention is that the actuator can be actuated with a conventional tool, in particular a screwdriver, in particular a flat-blade screwdriver, so that the connection device, which comprises the actuator, can be assembled in the field. In particular, the actuator can be pressed into an actuating opening of an insulating body of the connection device using the aforementioned tool in the first method step in order to electrically connect the electrical conductor to the busbar. In the second method step, the actuator can then be moved to its second open position by rotating the tool, in particular the screwdriver, in order to disconnect the electrical conductor from the busbar again.

A particular advantage of the invention is that the actuator for releasing the electrical conductor from the busbar can be moved from its closed position to its second open position by means of such a tool, in particular the screwdriver, without the tool, in particular the screwdriver, having to be inclined relative to the cable insertion direction. In other words, the screwdriver for disconnecting the electrical conductor coming from the direction of the cable connection can always be aligned parallel to the cable insertion direction, not only during the connection, but also during the entire disconnection process. Lastly, the release actuation is possible solely by space-saving rotation, i.e., rotational movement, of the actuator, in particular the rotation about its cylinder axis, even in very confined spaces.

In an advantageous embodiment of the invention, the actuator has a substantially cylindrical basic shape with a cylindrical axis and a cylindrical lateral surface, wherein a one-sided actuating recess is molded into the cylindrical lateral surface of the actuator. One-sided means that the recess is not circumferential. In particular, the recess does not extend over the entire length of the actuator, even in the axial direction, but only over an actuating portion of the actuator. Preferably, the recess has at least one engagement slope for interacting with the tensioning leg of the cage tension spring during actuation. Beyond the engagement slope, the actuator has a tensioning shoulder.

In an advantageous development of the invention, said rotational movement, by means of which the actuator can be transferred from the closed position to a second open position, takes place in a first direction of rotation and is carried out by the actuator about its cylinder axis extending in the cable insertion direction.

In a further preferred embodiment of the invention, the actuator can have an actuating surface at its end pointing into the cable connection side. This actuating surface can preferably have a shape that is particularly suitable for actuation. For example, the actuating surface may have an actuating slot for attaching a tool, in particular said screwdriver, in particular a flat-blade screwdriver.

In a preferred embodiment, a connection device can comprise the actuator, a busbar, a cage tension spring and an insulating body.

The insulating body can have an actuating opening for receiving the actuator and a cable insertion opening for inserting an electrical conductor in a cable insertion direction. The cage tension spring can have a tensioning leg with a window recess and a contact leg that engages through the window recess. A contact leg of the cage tension spring can be located in the region of the cable insertion opening of the insulating body together with the busbar arranged on it. The actuator is arranged in the actuating opening and interacts with the tensioning leg of the tensioning spring. The actuating opening can also be substantially hollow-cylindrical and the actuator can be held rotatably in it.

In a preferred development of the invention, a portion of the tensioning leg of the cage tension spring can be inserted into the actuating recess of the actuator in the closed position of the latter, whereby the cage tension spring at least partially relaxes. The cage tension spring can grip the electrical conductor with its window recess and thus pull it against the busbar in order to connect the electrical conductor to the busbar in an electrically conductive manner and to fix it mechanically thereto.

In an advantageous embodiment of the invention, the insulating body can have a guide pin in a cylindrical inner wall of its actuating opening and the actuator can have a first and a second guide groove in its lateral surface, in which the guide pin optionally engages. The first guide groove runs parallel to the cylinder axis and serves to guide the actuator during said translational movement. The second guide groove runs perpendicular to the cylinder axis in order to guide the actuator during said rotational movement. The first and second guide grooves are connected to each other at a common end point. The actuator is in its closed position when the guide pin of the insulating body is located at this common end point.

Thus, in a preferred development of the invention, the first guide groove and the second guide groove run perpendicular to each other and together form an L-shape in the cylinder lateral surface of the actuator.

In a preferred embodiment of the invention, a plug connector has the connection device and at least one plug contact, which is arranged in a contact chamber of the insulating body. The contact chamber can be connected to the cable insertion opening on the cable connection side and can be open on the plug side for connecting the plug contact to a mating plug contact of a mating plug. The busbar can be part of the plug contact or at least can be electrically conductively connected to the plug contact.

A particular advantage of such a plug connector is the possibility of using jumpers on the cable connection side between the individual contact chambers arranged at the respective cable insertion openings in the insulating body. Lastly, such jumpers do not have to be released in order to remove the respective electrical conductors, as their release process can be carried out by a rotary movement, namely said first rotary movement of the actuator about its cylinder axis. The electrical conductors, in particular stranded wires of the cables, can therefore be detached accordingly and in particular also replaced without having to remove the jumpers.

EXEMPLARY EMBODIMENT

Figure 2A:
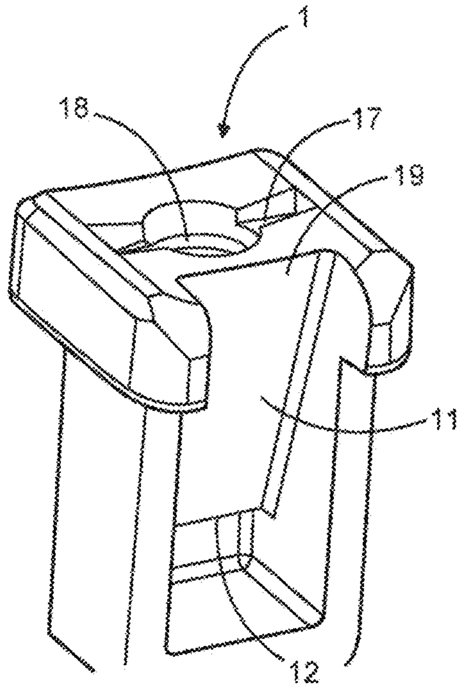
Figure 3:
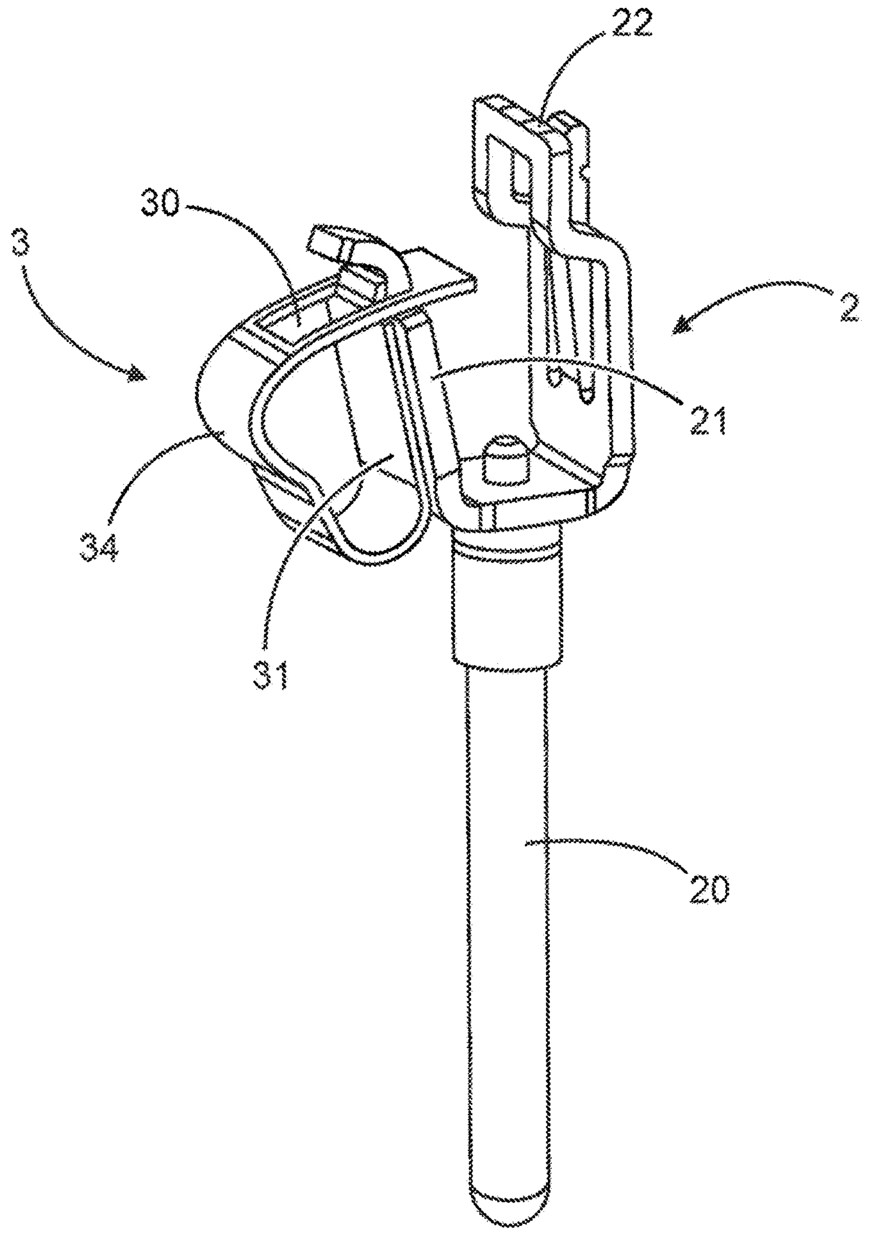
Fig. 3 PRIOR ART
Figure 4A:
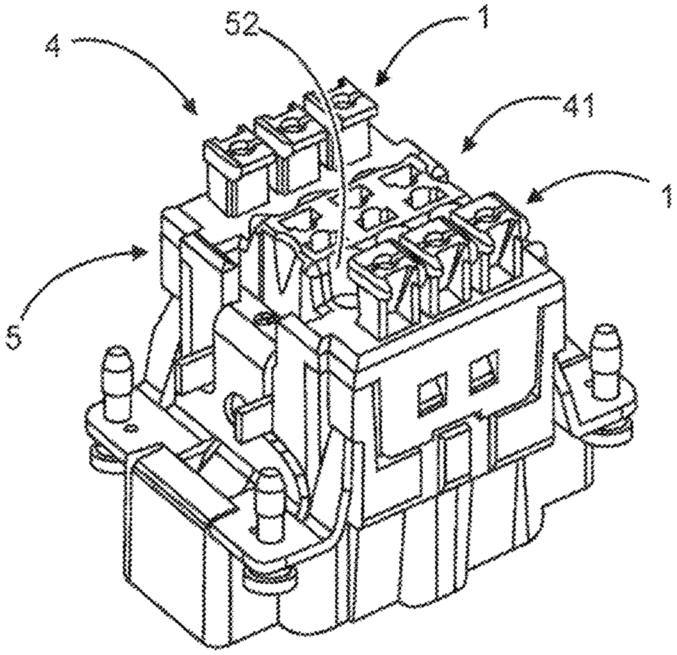
Figure 5A:
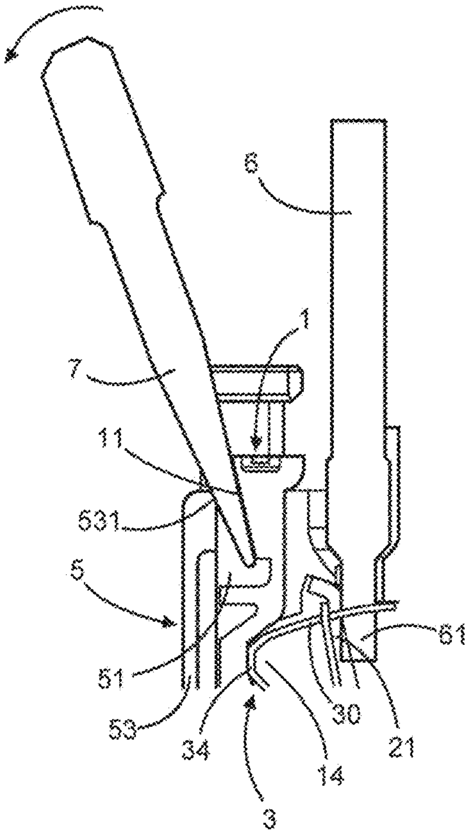
Figures 6A, 6B, 6C:
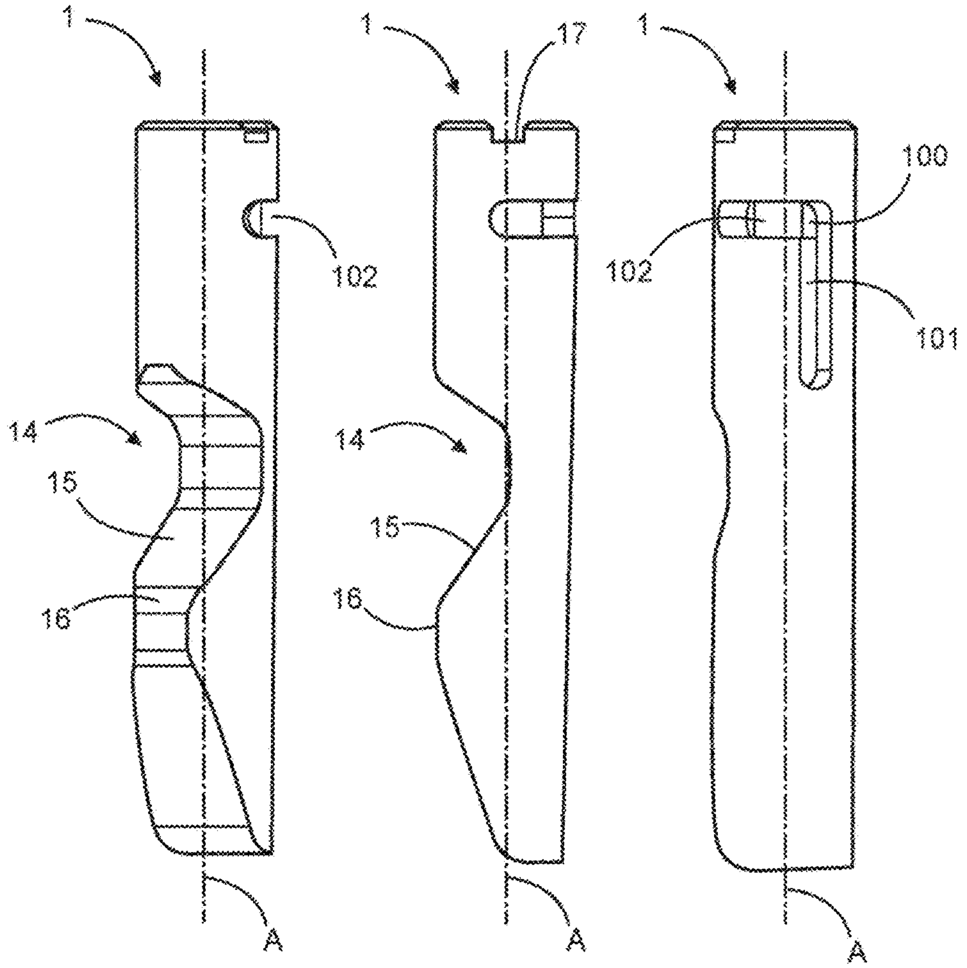
Figure 7A:
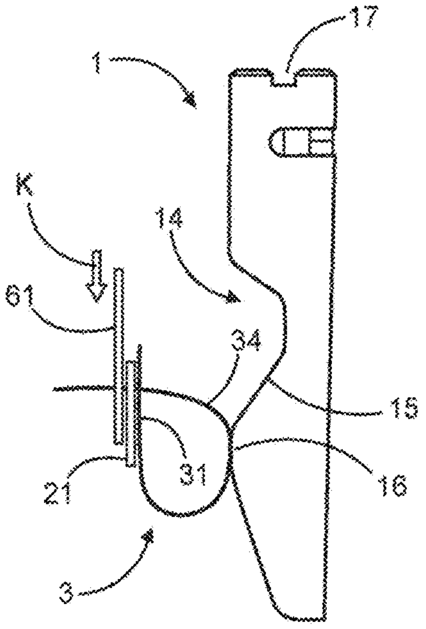

An exemplary embodiment of the invention is shown in the drawings and is explained in greater detail below. In the drawings:

FIGS. 1*a, b, c* show an actuator known from the prior art from different views and in section;

FIGS. 2*a, b, c* show the upper part of the aforementioned actuator in various views and in section;

FIG. 3 shows an electrical connection contact with a busbar and a contact pin as well as a cage tension spring arranged on the busbar;

FIGS. 4*a, b* show a connection device known from the prior art with a view of the cable connection side in oblique plan view and in section;

FIGS. 5*a, b* show a sectional view of the unlocking process known from the prior art;

FIGS. 6*a, b, c* show a substantially cylindrical actuator from different viewing angles;

FIGS. 7*a, b, c* show the aforementioned actuator with schematically depicted busbar and cage tension spring in various positions;

FIGS. 8*a-e* show the actuator in different rotational positions/from different viewing angles.

Some of the figures contain simplified, schematic representations. In some cases, identical reference signs are used for like but possibly not identical elements. Different views of the same elements may be scaled differently. Directional indications such as "left", "right", "top" and "bottom" are to be understood with reference to the respective figure and may vary in the individual illustrations in relation to the object shown.

FIG. 1*a* shows an actuator 1 known from the prior art with a view of an engagement slope 11 and an adjacent engagement edge 12. There is also a tool insertion opening 19 in the upper region.

FIG. 1*b* shows a side view of this actuator 1. From this view, a special actuating recess 14 can be seen, which has a tensioning slope 15. Adjacent to this, the actuator 1 has a tensioning shoulder 16.

FIG. 1*c* shows the actuator 1 in a sectional view from the same perspective as the previous illustration. The tool insertion opening 19 as well as the engagement slope 11, the engagement edge 12 and the engagement step 13 are also clearly visible. These are suitable for transferring the actuator 1 from its actuated state to its non-actuated state.

Figure 2B:
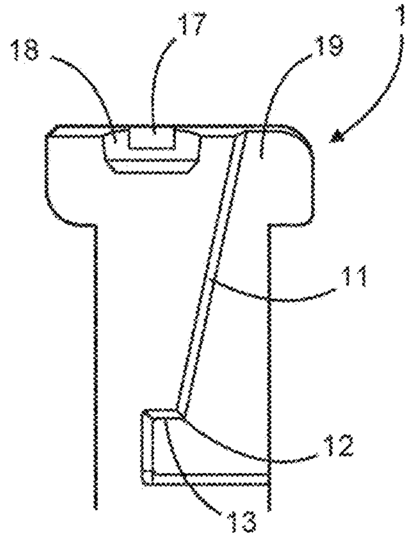
Figure 2C:
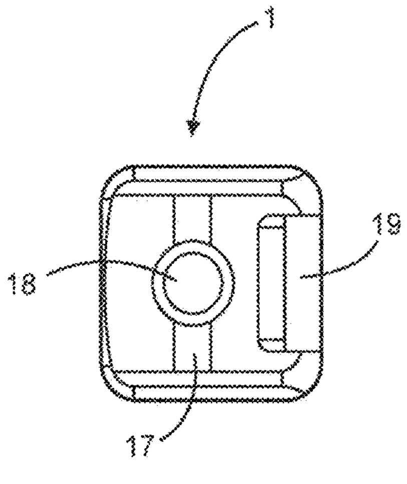
Fig. 2c PRIOR ART

FIGS. 2*a*, 2*b* and 2*c* show the upper region of the actuator 1 in an oblique plan view, a further sectional view and a plan view. The shape of the engagement slopes 11 can be seen particularly well in FIG. 2*a*. In FIG. 2*b*, the engagement step 13 can be seen particularly clearly and in FIG. 2*c*, the shape and position of the tool insertion opening 19 can be seen very clearly. Furthermore, a slot-shaped recess 17 and a cylindrical recess 18 are shown in all three illustrations. These are used to transfer the actuator 1 from the unactuated state to the actuated state. For example, a flat-blade screwdriver 7, not shown in this illustration, can be applied to the slot-shaped recess 17 in order to press down the actuator 1. The cylindrical recess 18 would be more suitable for application of a pin or similar.

FIG. 3 shows an electrical connection contact 2 known from the prior art with a contact pin 20 on the plug side, a fastening clamp 22 for fastening in or on the insulating body 5, not shown here, and a busbar 21 on the cable connection side, against which the cage tension spring 3 with its flat contact surface 31 rests over a large area. Furthermore, the cage tension spring 3 has a window recess 30, with which it grips a slightly angled end adjacent to its contact surface 31 and also grips an angled end of the busbar 21 facing away from the contact pin 20 and thus presses its contact surface 31 against the busbar 21 by means of its spring force.

In a region facing away from the contact surface 31, the cage tension spring 3 has a tensioning leg 34 which, in the at least partially relaxed state in which the cage tension spring 3 is present in this illustration, already reveals the contour of the actuating recess 14 of the actuator 1. In fact, the cage tension spring 3 is intended to be inserted with its tensioning leg 34 into the actuating recess 14 of the actuator 1 and to interact mechanically with it.

Figure 4B:
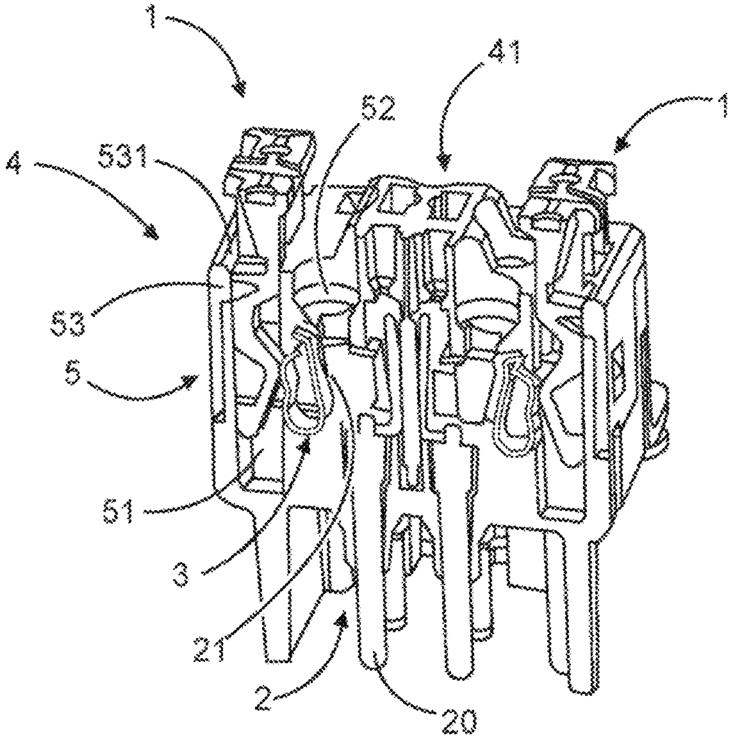
Fig. 4b PRIOR ART

FIG. 4*a* shows a connection device 4 known from the prior art in a 3D representation with a view of the connection side 41. FIG. 4*b* shows the connection device 4 from a slightly different perspective with a section through its plane of symmetry.

The connection device 4 comprises an insulating body 5. The insulating body 5 has an actuating opening 51, into which the actuator 1 is inserted in its non-actuated position, a cable insertion opening 52, in which the window recess 30 of the cage tension spring 3 is located, wherein only the rear region of the window recess 30 can be seen in the sectional view. Since the section runs through the plane of symmetry of the connection device 4, which has a mirror-symmetrical structure, the position of the window recess 30 in the cable insertion opening 52 in the non-actuated state is clear from this representation.

Furthermore, the busbar 21 of the connection contact 2 is arranged in the cable insertion opening 52. It can thus be clearly seen that the cage tension spring 3 is arranged substantially between the actuating opening 51 and the cable insertion opening 52, which means that, on the one hand, its tensioning leg 34 can also enter the actuating recess 14 of the actuator 1 and thus the actuating opening 51 of the insulating body 5 when the actuator 1 is actuated and that, on the other hand, the cage tension spring 3 engages with its window recess 30 in the cable insertion opening 52 or even passes through it with its second, free-standing end located at the window recess 30, at least in the non-actuated state.

Furthermore, the insulating body 5 has an outer wall 53 with a lever contour 531.

Figure 5B:
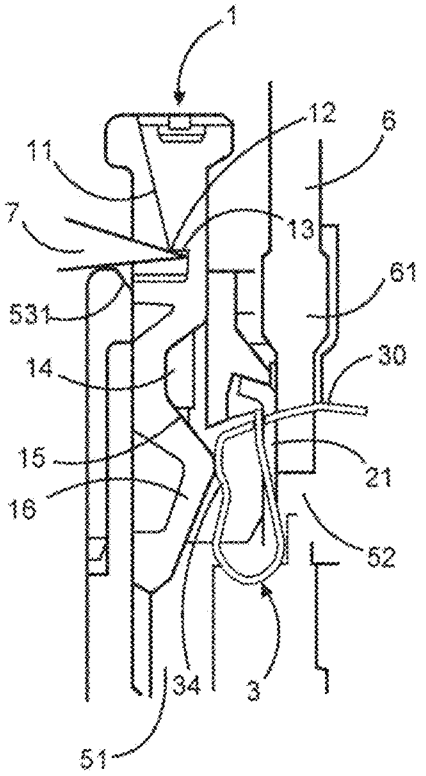
Fig. 5b PRIOR ART

FIGS. 5*a* and 5*b* show an unlocking process known from the prior art, in which the actuator 1 is transferred from its actuated state, i.e., its actuated position in the insulating body 5, into its non-actuated state, i.e., its non-actuated position in the insulating body 5.

FIG. 5*a* shows the actuator 1 known from the prior art in its actuated state, i.e. its actuated position. The cage tension spring 3 is at least partially relaxed, as its tensioning leg 34, shown at the lower edge of the picture, plunges into the actuating recess 14 of the actuator 1. At the same time, the cage tension spring 3 uses its window recess 30 to pull a stripped region 61, in this case a stranded wire, of the electrical conductor 6 against the busbar 21, to which it is thus electrically conductively connected.

For unlocking, a tool 7, specifically in this case a flat-blade screwdriver, is now inserted through the tool insertion opening 19 of the actuator 1 into the actuation opening 51 and thus between the actuator 1 and an outer wall 35 of the insulating body 5. The flat-blade screwdriver 7 now engages on the one hand with the contact surface 11 of the actuator 1 over its entire length. On the other hand, it is in mechanical contact with a special lever contour 531 of the outer wall 53.

By levering in the direction of the arrow, it pushes the actuator 1 upwards by a first distance, i.e., out of the actuating opening. During this process, the special lever contour 531 also changes the axis of rotation of the lever in the unlocking direction of the actuator 1, thereby extending the portion in which the tool 7 engages with the actuating slope 11 in optimum alignment. It is easy to see that the flat-blade screwdriver 7 engages on the engagement edge 12 when levering further in this direction, but could also engage on the engagement step 13 if it had a slightly different shape.

FIG. 5*b* shows the actuator 1 known from the prior art in its unactuated state, i.e., in an unactuated position. The flat-blade screwdriver 7 levers over the upper engagement edge 12 of the lever contour 531 and engages with the engagement edge 12 of the actuator 1.

The tensioning leg 34 of the cage tension spring 3 is fixed in the direction of the busbar 21 by the tensioning shoulder 16 of the actuator 1, after it has already been moved in this direction by the tensioning slope 15, and thus releases the electrical conductor 6 at its stripped region 61.

FIGS. 6*a-c* show the actuator 1 from various viewing angles in a modified design, which is to be regarded as an exemplary embodiment of the present invention. In this design, the actuator has a substantially cylindrical basic shape and thus has a cylindrical axis A, which is shown here in the drawing. In this design, the actuator 1 also has an actuating recess 14 on one side, i.e. not circumferential, with a tensioning slope 15 and an adjacent tensioning shoulder 16. However, in contrast to the design shown in FIG. 1, it does not have a tool insertion opening. Instead, as can be seen particularly well in FIG. 6*c*, it has a first 101 and a second 102 guide groove in its cylindrical surface, which together form an L-shape. The first guide groove 101 runs parallel to the cylinder axis A, the second guide groove 102 runs perpendicular to it. The two guide grooves meet at a common end point 100.

Accordingly, the associated insulating body 5 (not shown) in a slightly modified version compared to FIGS. 4*a* and b has a substantially cylindrical actuating opening 51 with a guide pin (not shown) arranged therein. In this cylindrical actuating opening 51, the aforementioned actuator 1 is held rotatably about its cylindrical axis A when the guide pin engages in the first guide groove 101 and is held displaceably in the direction of its cylindrical axis A when the guide pin engages in the second guide groove 102. When the actuator 1 is in its closed position, the guide pin is located at the common end point 100.

Otherwise, the insulating body 5, which is not shown, corresponds substantially to the embodiment shown in the previous FIGS. 4*a* and 4*b*.

The insulating body 5 with its hollow-cylindrical actuating opening 51, or more precisely, in the cylindrical inner wall of its actuating opening 51 (not shown) and the guide pin (not shown) arranged thereon, is thus designed to cooperate with the respective guide groove 101, 102 of the actuator during its actuation, namely to guide the actuator 1 during its respective actuation and to limit this movement in each case.

Figure 7B:
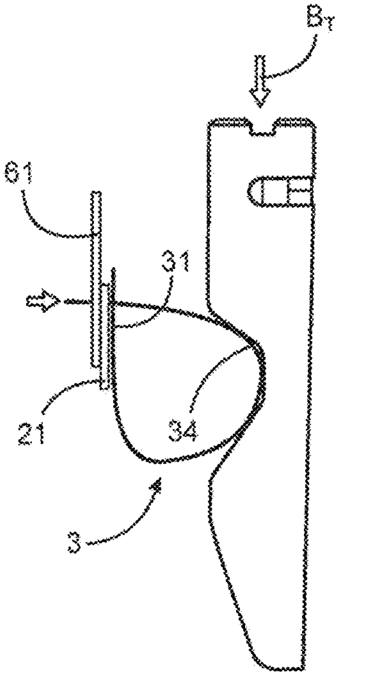
Figure 7C:
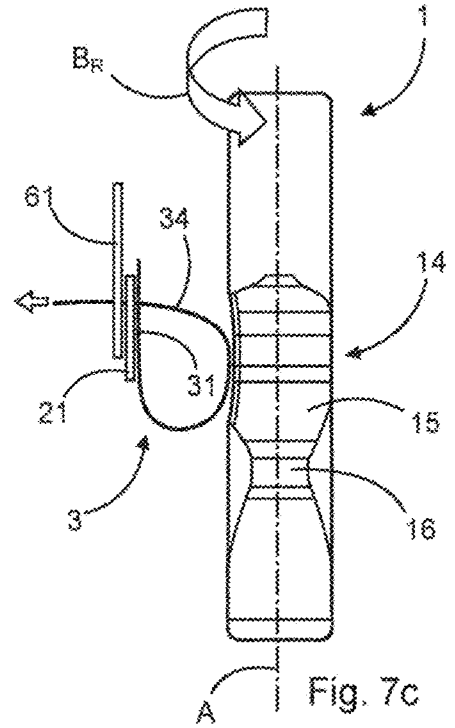
Figure 8A:
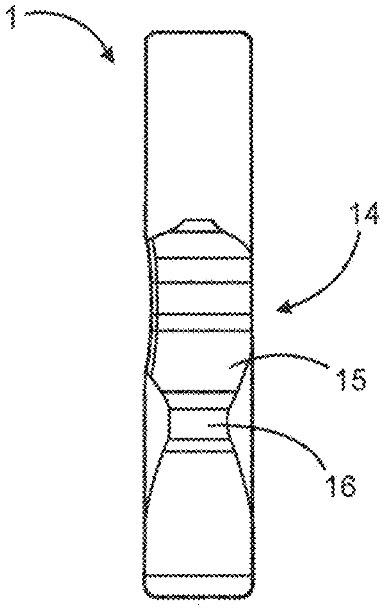
Figure 8B:
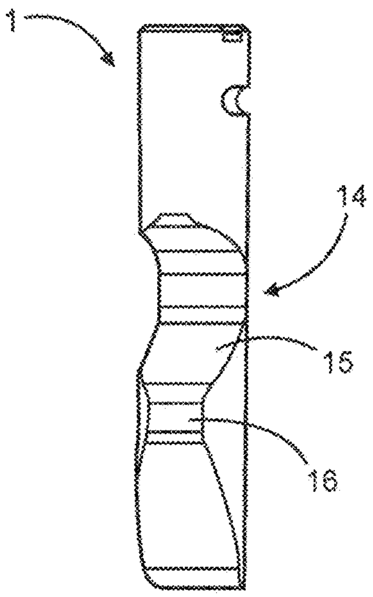
Figure 8C:
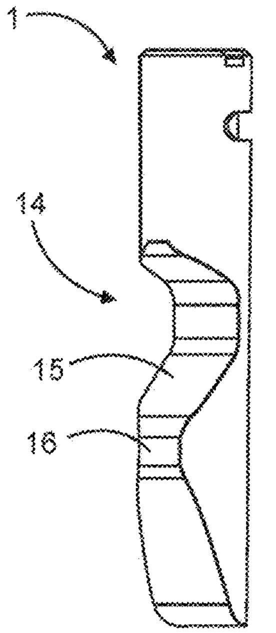
Figure 8D:
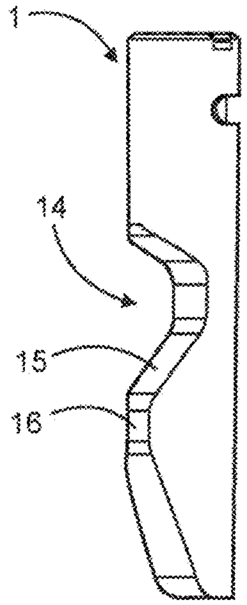
Figure 8E:
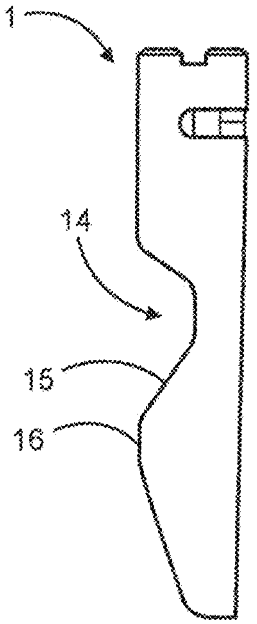

The actuation of this substantially cylindrical actuator can consist of a translational movement, which can be seen in the schematic diagrams of FIGS. 7*a* and 7*b* in the common context, or can consist of a rotational movement, which can be seen in the schematic diagrams of FIGS. 7*b* and 7*c* in the common context.

FIG. 7*a* shows how, in a first open position, the actuator 1 engages with its tensioning shoulder 16 on the tensioning leg 34 of the cage tension spring 3, as a result of which the cage tension spring 3 is in a comparatively tensioned state. At the same time, the cage tension spring 3 rests with its contact leg 31 against the busbar 21, wherein the busbar 21 and the contact leg 31 engage through the window recess 30, as shown in FIG. 3. As a result, the window recess 30 is open in the direction of the busbar 2, so that the electrical conductor 6 with its stripped region 61, as shown in FIGS. 4*b* and 5*b*, can be inserted into window recess 30 on the busbar side in the cable insertion direction K or, if necessary, removed from it in the opposite direction.

By contrast, FIG. 7*b* shows that the actuator 1 is displaced in translation relative to the busbar 21 and the cage tension spring 3 in the translational actuating direction $B_T$ parallel to the cable insertion direction K and the cylinder axis A, i.e., from top to bottom in the drawing, into its closed position, as a result of which the tensioning leg 34 of the cage tension spring 3 is partially inserted into the actuating recess 14 of the actuator 1. As a result, the window recess is "closed", i.e., the electrical conductor 6 is pulled with its stripped region 61, as shown in FIG. 5*a*, with the window recess against the busbar 21 by the spring force, while the cage tension spring 3 at least partially relaxes. During this translational movement along the cylinder axis A, which runs in the cable insertion direction K, the guide pin of the insulating body 5 engages in the first guide groove 101 of the actuator 1 for guidance. In addition, the length of the first guide groove 101 limits the translational sliding movement of the actuator 1 in this way. This translational transfer of the actuator 1 from the first open position to the closed position can be carried out by means of a tool, in particular the flat-blade screwdriver 7 (not shown here), wherein the tool in the drawing presses on the actuator 1 from above, engaging for example in the slot-shaped recess 17 of the actuator 1 and pressing the actuator 1 into the actuating opening 51 of the insulating body 5, not shown here. The screwdriver 7 is aligned parallel to the cylinder axis A of the actuator 1—and thus to the cable insertion direction K—during the entire actuation process.

In FIG. 7*c*, on the other hand, the actuator 1 is rotated by 90° about its cylinder axis A and thus shown in its second open position. This rotation serves to transfer the actuator 1 from its closed position to its second open position in order to release the electrical conductor 61 from the busbar 21. This process can also be carried out manually using the flat-blade screwdriver 7, wherein the flat-blade screwdriver 7 engages in the slot-shaped recess 17 of the actuator 1 and rotates the actuator 1 about its cylindrical axis A. During the entire connection and disconnection process, the flat-blade screwdriver 7 is aligned parallel to the cylinder axis A. During the rotation/rotational movement, the aforementioned guide pin (not shown) of the insulator 5 engages in the second guide groove 102 of the actuator 1. As a result, the length of the second guide groove 102 limits this rotational movement.

This illustration also shows that the tensioning leg 34 of the cage tension spring 3 is displaced from its actuating recess 14 by the rotation of the actuator 1 in the direction of the arrow, i.e. in a first direction of rotation/in a first rotational actuating direction. The cage tension spring 30 is thus tensioned more strongly again and the window recess 30 is opened, so that the electrical conductor 6 is released from the busbar 21 and can be removed from the connection device against the cable insertion direction (i.e., upwards in the drawing).

To reconnect an electrical conductor 6, such as another core of the cable or another cable, the actuator 1 can also be turned back against the direction of the arrow, if necessary, in order to return to its closed position, which—as already mentioned—is shown in FIG. 7*b*. If the insulating body 5 is not installed in an add-on housing or in a confined engine compartment or similar, or if it has been removed from the latter, the actuator 1 can of course also be returned to its first open position, wherein the tool, however, is then no longer aligned parallel to the cable insertion device/cylinder axis. This only serves to re-establish the initial situation.

Although the flat-blade screwdriver 7 is not explicitly shown as a tool in FIGS. 6*a* to 7*e*, it is clear to a person skilled in the art from these illustrations and/or the preceding description that such a flat-blade screwdriver, or a similarly acting tool, is aligned parallel to the cylinder axis A and thus in the cable insertion direction for all actuations explained in conjunction with FIGS. 7*a* to 7*c*. This minimizes the space required for actuation—which is horizontal in the drawing—i.e. the space required perpendicular to the cylinder axis A, compared to the arrangement shown in FIG. 5*a*.

FIGS. 8*a*-8*e* show the substantially cylindrical actuator 1 in several rotational stages or-viewed differently-from different angles for the sake of completeness.

LIST OF REFERENCE SIGNS

1 actuator
11 engagement slope
12 engagement edge
13 engagement step
14 actuating recess
15 tensioning slope
16 tensioning shoulder
17 slot-shaped recess
18 cylindrical recess
19 tool insertion opening
101, 102 first, second guide groove
100 common end point of the two guide grooves
2 electrical connection contact
20 contact pin, plug contact
21 busbar
22 fastening clamp
3 cage tension spring
30 window recess
31 contact leg
34 tensioning leg
4 connection device
41 cable connection side of the connection device
5 insulating body
51 actuating opening
52 cable insertion opening
53 outer wall of the insulating body
531 lever contour
6 electrical conductor
61 stripped region/stranded wire/electrical conductor
7 tool/flat-blade screwdriver
A cylinder axis
K cable insertion device
$B_T$ actuating direction translatory
$B_R$ actuating direction rotary/first direction of rotation

The invention claimed is:

1. An actuator for actuating a cage tension spring of a connection device, wherein the actuator can be brought into a first open position, in which it tensions the cage tension spring and thus enables an electrical conductor to be guided through a window recess of a tensioning leg of the cage tension spring in a cable insertion direction and which furthermore can be brought into a closed position, in which the actuator comparatively relaxes the cage tension spring with respect to the aforementioned open position and thus allows the electrical conductor arranged in the window recess to be electrically contacted by the cage tension spring with a busbar likewise guided through the window recess and is mechanically fixed to the busbar, wherein the actuator can be transferred from the first open position into the closed position by a translational movement, wherein the actuator can furthermore be transferred from the closed position to a second open position by a rotational movement, in which it tensions the cage tension spring again relative to the closed position and thus enables the electrical conductor to be removed from the window recess of the tensioning leg of the cage tension spring counter to the cable insertion direction.

2. The actuator as claimed in claim 1, wherein the actuator has a substantially cylindrical basic shape with a cylinder axis and a cylinder lateral surface, wherein an actuating recess on one side is molded into the cylinder lateral surface of the actuator.

3. The actuator as claimed in claim 2, wherein the actuator performs said rotational movement, by which it can be transferred from the closed position to a second open position, in a first direction of rotation about its cylinder axis extending in the cable insertion direction.

4. The actuator as claimed in claim 3, wherein the actuator can be transferred from the second open position into the closed position by a second rotational movement about its cylinder axis in a second rotational direction which is opposite to the first rotational direction.

5. A connection device, comprising the actuator as claimed in claim 1, a busbar, a cage tension spring and an insulating body, wherein the insulating body has a hollow-cylindrical actuating opening configured for receiving the actuator and a cable insertion opening for inserting an electrical conductor in a cable insertion direction, and wherein the cage tension spring has a tensioning leg with a window recess and a contact leg configured engaging through the window recess, and wherein the contact leg together with the busbar held thereon is located in the region of the cable insertion opening, and wherein the actuator is arranged in the actuating opening and interacts with the tensioning leg of the tensioning spring.

6. The connection device as claimed in claim 5, wherein the tensioning leg of the cage tension spring is in mechanical contact with the actuating recess of the actuator in the closed position of the latter, and in that the cage tension spring, which grips the electrical conductor with its window recess, pulls it against the busbar in order to connect the electrical conductor to the busbar in an electrically conductive manner.

7. The connection device as claimed in claim 5, wherein the insulating body has a guide pin in a cylindrical inner wall of its actuating opening, and wherein the actuator has a first and a second guide groove in its lateral surface, in which the guide pin engages, wherein the first guide groove extends perpendicular to the cylinder axis, in order to guide the actuator during said rotational movement, and wherein the second guide groove, which serves to guide the actuator during said translatory displacement, extends parallel to the cylinder axis, wherein the first and the second guide groove are connected to one another at a common end point, and wherein the actuator is in its closed position when the guide pin is located at the common end point.

8. The connection device as claimed in claim 7, wherein the first guide groove and the second guide groove extend perpendicular to each other and together form an L-shape in the cylinder lateral surface of the actuator.

9. A plug connector, comprising the connection device as claimed in claim 5 and at least one plug contact which is arranged in a contact chamber of the insulating body, wherein the contact chamber is connected on the cable connection side to the cable insertion opening and is open on the plug side for connecting the plug contact to a mating plug contact of a mating plug, and wherein the busbar is part of the plug contact or is connected to the plug contact in at least an electrically conductive manner.

10. A method for the electrical connection and subsequent disconnection of an electrical conductor to or from a busbar, in particular to a connection device as claimed in claim 5, wherein the electrical conductor is electrically conductively contacted with the busbar in a first method step by a translational movement of an actuator and mechanically fixed thereto, and wherein the electrical conductor is released from the busbar in a second method step by a rotational movement of the actuator.

11. The method as claimed in claim 10, wherein the actuator configured to be is actuated with a screwdriver both in the first and in the second method step, wherein the screwdriver is always aligned in the direction of the translational movement in the two aforementioned method steps.

12. The method as claimed in claim 10, wherein in the first method step the electrical conductor is pulled against a busbar for electrical contacting a cage tension spring, in that a portion of a tensioning leg of the cage tension spring is inserted into an actuating recess of the actuator by the translational movement of the actuator, and wherein the electrical conductor is separated from the busbar in the second method step by the aforementioned portion of the tensioning leg of the cage tension spring being displaced out of the actuating recess again by the rotational movement of the actuator.

13. The connection device as claimed in claim 6, wherein the insulating body has a guide pin in a cylindrical inner wall of its actuating opening, and wherein the actuator has a first and a second guide groove in its lateral surface, in which the guide pin engages, wherein the first guide groove extends perpendicular to the cylinder axis, in order to guide the actuator during said rotational movement, and wherein the second guide groove, which serves to guide the actuator during said translatory displacement, extends parallel to the cylinder axis, wherein the first and the second guide groove are connected to one another at a common end point, and wherein the actuator is in its closed position when the guide pin is located at the common end point.

14. The connection device as claimed in claim 13, wherein the first guide groove and the second guide groove extend perpendicular to each other and together form an L-shape in the cylinder lateral surface of the actuator.

15. A plug connector, comprising the connection device as claimed in claim 6 and at least one plug contact which is arranged in a contact chamber of the insulating body, wherein the contact chamber is connected on the cable connection side to the cable insertion opening and is open on the plug side for connecting the plug contact to a mating plug contact of a mating plug, and wherein the busbar is part of the plug contact or is connected to the plug contact in at least an electrically conductive manner.

16. A plug connector, comprising the connection device as claimed in claim 7 and at least one plug contact which is arranged in a contact chamber of the insulating body, wherein the contact chamber is connected on the cable connection side to the cable insertion opening and is open on the plug side for connecting the plug contact to a mating plug contact of a mating plug, and wherein the busbar is part of the plug contact or is connected to the plug contact in at least an electrically conductive manner.

17. A plug connector, comprising the connection device as claimed in claim 8 and at least one plug contact which is arranged in a contact chamber of the insulating body, wherein the contact chamber is connected on the cable connection side to the cable insertion opening and is open on the plug side for connecting the plug contact to a mating plug contact of a mating plug, and wherein the busbar is part of the plug contact or is connected to the plug contact in at least an electrically conductive manner.

18. A plug connector, comprising the connection device as claimed in claim 13 and at least one plug contact which is arranged in a contact chamber of the insulating body, wherein the contact chamber is connected on the cable connection side to the cable insertion opening and is open on the plug side for connecting the plug contact to a mating plug contact of a mating plug, and wherein the busbar is part of the plug contact or is connected to the plug contact in at least an electrically conductive manner.

19. A plug connector, comprising the connection device as claimed in claim 14 and at least one plug contact which is arranged in a contact chamber of the insulating body, wherein the contact chamber is connected on the cable connection side to the cable insertion opening and is open on the plug side for connecting the plug contact to a mating plug contact of a mating plug, and wherein the busbar is part of the plug contact or is connected to the plug contact in at least an electrically conductive manner.

20. The method as claimed in claim 11, wherein in the first method step the electrical conductor is pulled against a busbar for electrical contacting a cage tension spring, in that a portion of a tensioning leg of the cage tension spring is inserted into an actuating recess of the actuator by the translational movement of the actuator, and wherein the electrical conductor is separated from the busbar in the second method step by the aforementioned portion of the tensioning leg of the cage tension spring being displaced out of the actuating recess again by the rotational movement of the actuator.

* * * * *